(12) United States Patent
Barkan et al.

(10) Patent No.: US 7,624,441 B2
(45) Date of Patent: Nov. 24, 2009

(54) CA IN A CARD

(76) Inventors: Elad Barkan, 12 Habanim Street, Kefar Sirkin (IL); Nir Barkan, 12 Habanim St., Kefar Sirkin (IL)

( * ) Notice: Subject to any disclaimer, the term of this patent is extended or adjusted under 35 U.S.C. 154(b) by 611 days.

(21) Appl. No.: 10/046,745

(22) Filed: Jan. 17, 2002

(65) Prior Publication Data

US 2003/0135731 A1 Jul. 17, 2003

(51) Int. Cl.
*H04L 9/32* (2006.01)
*H04L 9/38* (2006.01)

(52) U.S. Cl. .................... 726/18; 713/185; 713/173

(58) Field of Classification Search ......... 713/155–159, 713/173, 284, 185, 193–194; 726/9–10, 726/17–21
See application file for complete search history.

(56) References Cited

U.S. PATENT DOCUMENTS

| 5,604,804 | A | * | 2/1997 | Micali ........................ 713/157 |
| 5,721,781 | A | * | 2/1998 | Deo et al. ..................... 705/67 |
| 5,872,848 | A | * | 2/1999 | Romney et al. ............. 713/176 |
| 6,157,920 | A | * | 12/2000 | Jakobsson et al. ............. 705/69 |
| 6,513,117 | B2 | * | 1/2003 | Tarpenning et al. ......... 713/156 |
| 6,950,941 | B1 | * | 9/2005 | Lee et al. ..................... 713/193 |
| 2002/0112157 | A1 | * | 8/2002 | Doyle et al. ................. 713/157 |

FOREIGN PATENT DOCUMENTS

JP 2001088478 * 4/2001

OTHER PUBLICATIONS

ISA Search Report, PCT/IL99/00369, Dec. 14, 1999.*

* cited by examiner

*Primary Examiner*—Jung Kim
*Assistant Examiner*—Venkat Perungavoor

(57) ABSTRACT

A secure method for generating digital documents that are certified by a known authority, comprising the steps of: A. Programming an electronic device with a document issuing method that originates with the known authority; B. programming the electronic device with data identifying the owner of the device; C. reading a digital document into the device; D. physical identification of the owner of the device, based on the identifying data as programmed in step (B); E. if the result of the identification process in step (D) is positive, then issuing of a digital document signed by the known authority. A device for generating digital documents that are certified by a known authority, comprising a computer for implementing a program written in the memory, and wherein the memory includes a document issuing method that originates with the known authority; input means for reading information related to physical user identification; and output means.

15 Claims, 7 Drawing Sheets

CA IN A CARD

STATEMENT AS TO RIGHTS TO INVENTIONS MADE UNDER FEDERALLY SPONSORED R&D

There was no Federal sponsoring for the present invention, therefore there are no rights deriving therefrom.

FIELD OF THE INVENTION

The invention concerns systems for generation of digital documents and, in particular, to such systems that allow a user to generate permits or certificates for himself, based on prior documents and that user's identification.

BACKGROUND OF THE INVENTION

Heretofore, various systems and methods were used to generate digital documents like permits or certificates.

In prior art, a center or service provider checks a user and issues a certificate to acknowledge that he is indeed who he claims to be. Moreover, a certificate may include additional information related to that person.

To issue a certificate, the center has to identify that person. The authentication of user may be cumbersome at least.

This is a time-consuming process that is also costly—a waste of time and money.

Another authority may issue permits. These are digital documents that indicate a specific person is allowed to do specific actions. An entry pass to a factory is an example of a permit.

Again, the permit is issued personally to the legitimate holder. This may be a time-consuming process, that takes an effort on both sides—the issuer and the recipient of that permit.

It is an objective of the present invention to facilitate the generation of digital documents like permits or certificates.

SUMMARY OF THE INVENTION

It is an object of the present invention to provide a system and method for generating digital documents.

These documents may include, for example, permits or certificates.

The system allows a user to generate permits or certificates for himself, based on prior documents and that user's identification.

This object is achieved by a device that a customer can buy and use to generate digital document for that customer. To that purpose, the device includes means for automatic generation of digital documents.

Throughout the present disclosure, the device will be called "Certifying Authority (CA) in a card".

Furthermore in accordance with the invention, the object is basically accomplished by the CA in a card according to a routine and with parameters that were defined by a permit issuing authority.

The CA in a card is an autonomous device that implements a secure procedure to issue digital documents like permits or certificates.

The issuance of permits or certificates is based on two factors:

It uses prior identification of the user, as recorded in a prior issued digital document; and it physically identifies the user to ensure that the person asking for the certificate is the one to whom the prior document refers.

A card initialization method for the CA in a card is disclosed. This initialization is performed when the smart card is bought by a user.

The initialization may comprise either a full authentication method or a partial authentication method.

Another aspect of the invention is the structure of a smart card to implement the functions of a CA in a card.

Further objects, advantages and other features of the present invention will become obvious to those skilled in the art upon reading the disclosure set forth hereinafter.

BRIEF DESCRIPTION OF THE DRAWINGS

The invention will now be described by way of example and with reference to the accompanying drawings in which.

DETAILED DESCRIPTION OF THE PREFERRED EMBODIMENTS

A preferred embodiment of the present invention will now be described by way of example and with reference to the accompanying drawings.

Figure 1:
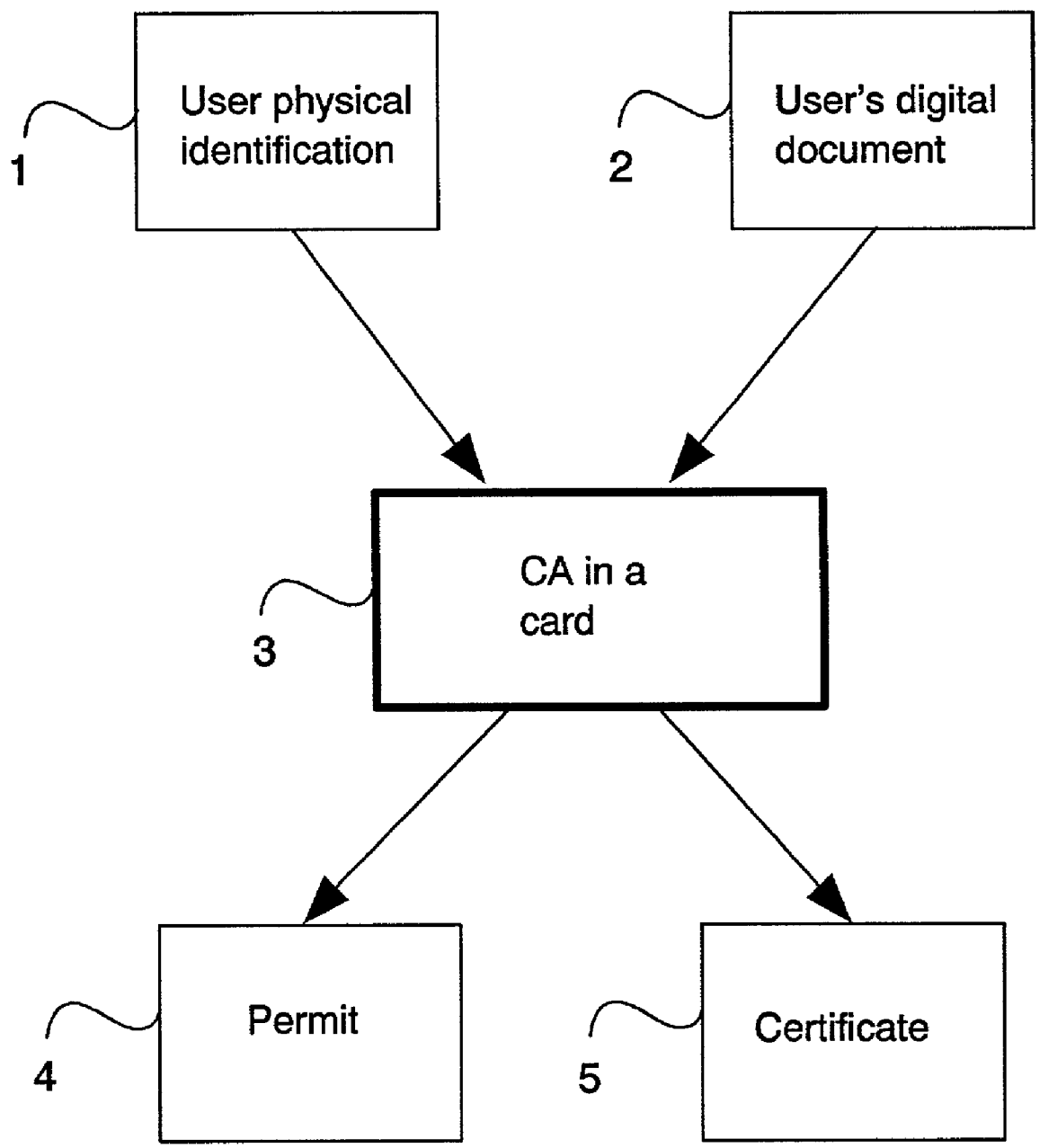
FIG. 1 illustrates the certificates generation method in CA in a card system

Referring to FIG. 1, illustrates a method for the generation of certificates are generated in CA in a card system 3.

Inputs used in the CA in a card 3 include signals from a user physical identification means 1 and a user's digital document 2.

Based on the above inputs, system 3 generates a permit 4 and/or a certificate 5 as desired by the user.

The structure illustrates the certificates generation method in CA in a card system 3.

Thus, the "CA in a card" novel concept refers to an autonomous device 3 that implements a secure procedure to issue digital documents like the permits 4 or certificates 5.

The CA device 3 is sold to customers. Thus, each customer may activate his/her CA device to generate digital documents at will. A limitation is that documents may be only generated according to CA policy.

The CA device 3 only operates according to an internal program that was written into the device by a recognized authority.

The CA device becomes, in effect, the agent or representative of that authority.

The CA device will implement the precise policy for issuing certificates set up by that authority.

The structure of the CA device 3 prevents tampering with the program therein, as the program is written in fixed memory means that cannot be altered. Even the user who owns the CA device is prevented from interfering with the actual operation of the device.

Therefore, the CA device will only issue a certificate or permit according to the rules set up by the authority that programmed that device.

If the terms for issuing the digital document are not met, then the CA device may refuse to issue that document altogether.

The CA device includes means to prove that the issuance of a certificate or permit was authorized by a known authority. These means may include, for example, a permit issued by that authority to the CA device.

Each CA device 3 is uniquely identified with a unique ID number. That number is included in the permit issued by the known authority to the device, and may be also included in digital documents generated by the device.

Alternately, a secondary number and/or an alphanumeric string may be generated responsive to the ID number and may be subsequently used in lieu of the ID number itself.

A certificate or permit, in order to be recognized by others, has to include an encryption or signature with the private key of a known authority.

That information is contained in the CA device in a secure memory, that is a memory that cannot be read nor cannot it altered by anyone. Only the device itself can update data therein or may destroy itself if necessary.

A distributed system can thus be implemented, wherein each user can create certificates for himself/herself, certificates that are authorized by a known authority.

A method of operation of CA in a card to issue digital documents like permits or certificates is based on two factors:
1. use prior identification of the user, as recorded in a prior issued digital document
2. physically identifies the user to ensure that the person asking for the certificate is the one to whom the prior document refers A smart card may contain a digital identification card. It may include information relating to the user, his/her photograph and additional personal information like a fingerprint or their signature.

It is also possible to use a secret password, that is known only to that person. A personal identification number PIN is an example of a password. In yet another embodiment, a combination of both a personal property and some personal information are used to identify that person.

The information in the smart card/certificate therein may be compared with the characteristics of the real person, to issue an authentication confirmation.

Thus, any person may prepare a certificate that is protected from tampering with and is authorized by a known authority.

Any person may issue an authorization for himself/herself with no possibility of cheating the system.

The process is based on:
A) A certificate held by that person, which certificate is already signed by a known authority
B) Personal identification of the certificate holder based on something personal to him/her: something he knows or a personal property/characteristic.
C) A protected procedure, set up by a known authority, to issue certificates based on A, B.

Thus, any person may issue certificates or various digital documents for himself/herself, based on a digital document in their possession.

At present, there are various organizations that will issue a digital document to a person, after they have identified that person.

The novel approach—any person who holds a digital document and has a smart card with a CA capability, can issue certificates or other digital documents for himself/herself.

For Example:

A person holds a Visa credit card, that is a digital document issued by an organization that is a member of the Visa group.

Visa has a known CA, so that it is accepted that the credit card holder has been already identified by that organization.

That person desires a permit that includes his name, the details of the credit card and additional information like the bank details.

To prove his identity, the card holder presents the credit card to a CA. A possible problem is that the credit card is stolen. There is the danger that a permit may be issued to the wrong person.

To solve this problem, the CA will require a means of personal identification, in addition to the presentation of the credit card. That personal identification means may include a personal identification number PIN.

The PIN may protect the information in the credit card. For example, a four digit PIN may be used. The PIN may represent the information in the credit card, encrypted or using a special-purpose hash.

The special-purpose hash may use a secret formula to compute the PIN.

The PIN is presented by the user and serves both to identify the user and to attest as to the integrity of the information in the credit card.

CA Method:
a. There is a CA backed by a known authority like Visa.
b. a smart card contains a "CA on a card", that is a capability to perform the functions of CA as defined by the original CA.
c. The new smart card, that is sold to a customer, contains:
   a pair of encryption keys, comprising a private and a public key
   an identification number (ID) that is unique to that smart card
   a digital certificate that links the above two values, that is the ID and the encryption key, issued by the known manufacturer of smart cards Initially, the smart card may contain only the ID, without the encryption keys. The encryption keys may be added later.

A permit or authorization from a known authority, that the smart card is authorized to issue permits in the name of that authority.

For example, Visa may issue a permit to the card that the card is authorized to issue permits/certificates in its name.

This method, in fact, transforms the smart card into a subcontractor of that known authority, for the purpose of issuing permits/certificates.

Thus, the smart card now can issue permits/certificates in the name of the original CA authority (Visa for example), to people desiring these documents from that known authority.

The unique ID in the smart card allows for traceability of the permit to source, that is to track the permit to source.

A permit may include a message to the effect that, for example "The person whose ID is 9094455 is allowed to enter the Casino in Tel Aviv".

This permit by itself cannot be used by a person to be admitted there. For that purpose, the user has to also present a certificate (another digital document) indicating that he/she indeed has that ID as mentioned in the permit.

The above method may be used to generate a plurality of permits for the owner of the CA in a card. To this purpose, the CA in a card reads a plurality of credit cards, telephone cards, cash cards and/or other types of cards, all belonging to the owner of the CA in a card. The owner is identified, to prevent unauthorized generation of permits by another person.

The device issues a digital document (a permit) for each card. Each such permit is backed by the authority of the certifying authority CA that established the method implemented in the smart card.

The permits thus generated may be used to replace the original credit cards, telephone cards etc. that formed the basis for the generation of the permits.

This is acceptable since the user proved that he/she is the legitimate owner of those cards and the permits were prepared in a reliable, secure method that is backed by the certifying authority.

The digital documents (for example permits) may be stored in the same smart card device that generated those documents. It may be more convenient for a user to carry just a smart card storing many permits, than to carry many plastic cards.

Thus, the permits are stored in the smart card without danger of damage to them. Plastic cards may be damaged by heat, magnets or other factors.

A user may have difficulty in holding many plastic cards. These may take a large volume and may be difficult to store. A smart card, using modern digital storage means, may hold many permits (cards) in a very small volume.

Plastic cards may be read by anyone. The magnetic stripe is always readable to all. The permits in the smart card, however, may be either presentable to all, or their presentation may be conditional, as the user may desire. The activation of the permits may be conditional, to ensure that only the legitimate owner may use them. To this purpose, a PIN may be used or a challenge, for example.

In yet another application of the present invention, another person may send a digital document to the smart card owner. For example, a document may include an entry pass to a private parking lot for a specific day and time. The document may be sent by a third party, for example, over the Internet like an E-mail.

Otherwise, a document may be sent over a wireless link like a cellular telephone.

Although the document may be sent over an open line, only the legitimate addressee may use the permit. This is achieved with the document containing a designation of the addressee, together with the requirement that the addressee identify himself/herself.

When a user receives such a digital document, he/she enters it into the smart card for storage therein. The document is ready to use as required. Using this novel approach, a plurality of documents, received from many sources, may be stored in the smart card.

Examples of such documents: entry passes, payments, credit line establishment for a specific user at a certain facility or store.

Therefore, the novel smart card can implement various functions:

a. A CA in a card, to generate permits or other digital documents for the holder of the device. The user may generate digital documents like permits or certificates from other documents.

b. A holder of digital documents issued by the card owner. A plurality of digital documents like permits and/or certificates may be securely stored in the device. The authenticity of the documents is attested to by the CA in a card. Any document may be presented and/or transmitted, as desired by the owner of the device.

c. A holder of digital documents received from a third party. Various digital documents, received from third parties, may be stored in the smart card. Any document may be presented and/or transmitted, as desired by the owner of the device.

These and other functions may be implemented in the smart card disclosed in the present invention.

A user may decide whether his/her smart card will be used as a CA in a card, as a holder of digital documents and/or for other functions.

A physical implementation of the smart card may include a wristwatch. The electronic circuitry of the wristwatch may implement both the functions of a watch and a smart card.

Such a device is easy to use and may be implemented at a low cost.

Alternately, the smart card may be implemented in various smart devices that include digital storage means and computing means.

In yet another implementation, the smart card may be implemented in a smart device.

The structure of the smart card is further detailed with reference to FIGS. 2 and 3 below.

Figure 2:
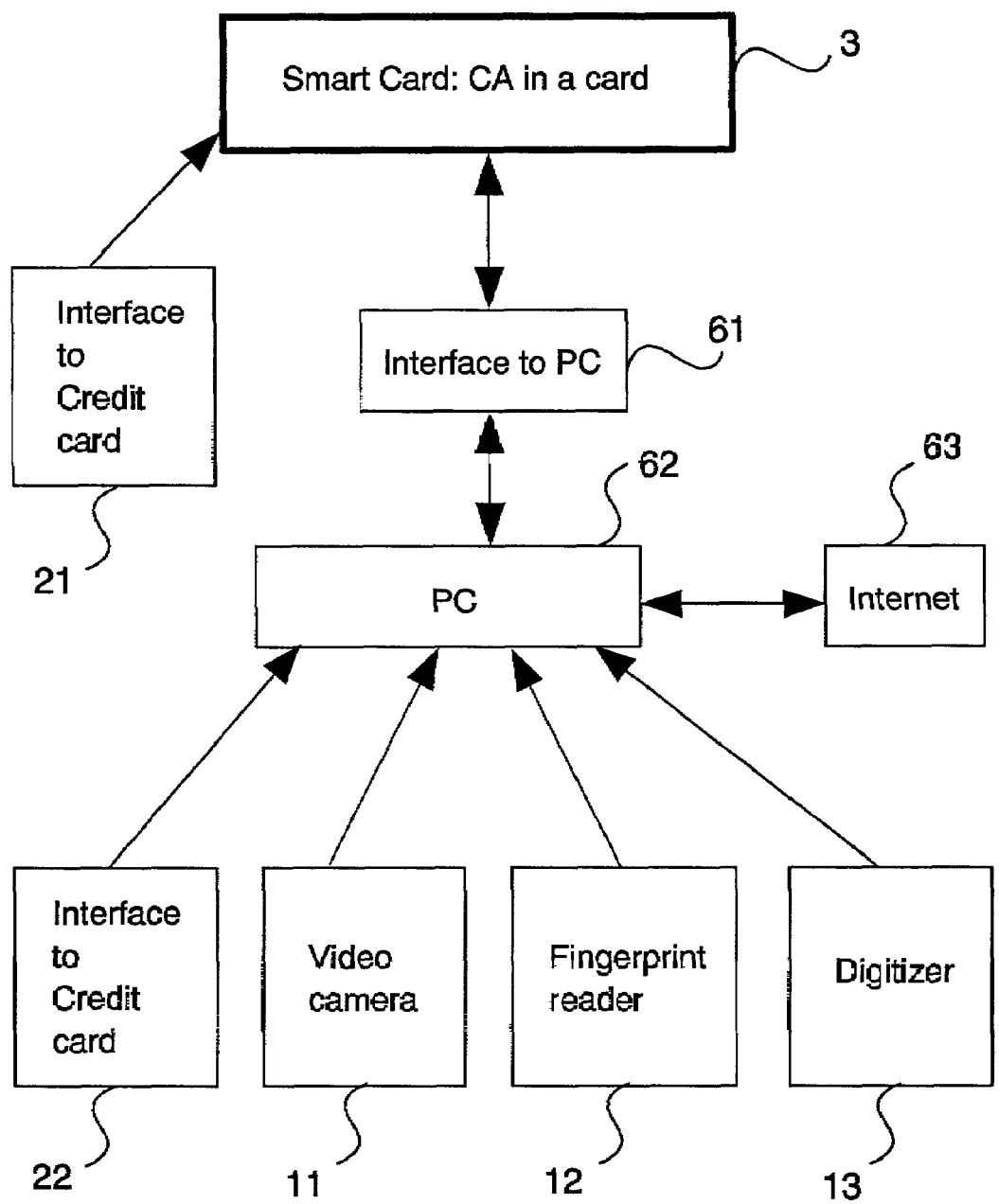
FIG. 2 details a CA in a card system

FIG. 2 details a CA in a card system. The CA in a card 3 is preferably implemented as a smart card device. To activate the device, it should be connected to external data sources.

For example, the smart card 3 may be directly connected to an interface to credit card 21 for reading a user's digital document in a credit card (not shown).

The device 3 may also be connected to a personal computer PC 62 through a PC interface 61. The PC 62 may be also connected to an Internet link 63.

Various input means may be connected to device 3 through computer 62, for example an interface to credit card 22 for reading a user's digital document in a credit card (not shown) through the PC 62. In this embodiment, the smart card 3 does not need a special-purpose interface, so it is easier cheaper to implement.

Other devices may be also connected to the device 3 through the PC 62, for example a video camera 11, a fingerprint reader 12 and/or a digitizer 13. The above means are means for implementing the user physical identification means 1 illustrated in FIG. 1

Various types of prior identification documents 2 may be used. Thus, the basis for the new certificate 5 may be another certificate 2 held by the user, that draws on a known authority.

This is a novel approach—the majority of people are already identified and are holding documents attesting to their identity. These may include an identity card, driver's license, a professional organization card, a student card, a credit card, an attorney card. Each one of these documents attests as to the identity of their holder/owner.

Each one of these documents may be used as a basis for user's identification, to issue a new certificate based on it.

Therefore, a new certificate may be issued without the need to again check the identity of the user.

The present invention thus teaches that a user may certify himself/herself based on that prior identification documents.

Various methods for physical identification of the user are detailed in FIG. 2, including for example means 11, 12 and/or 13.

The PC 62 may be connected to the Internet 63. If connected, it may function as a supervisor to ensure only legitimate access. The user enters manually identification information, and presents a smart card with certificate for access to Internet. If information relates OK, then access is granted to Internet. It also provides user authentication, to allow secure operations on the Internet, like buying merchandise on the net, accessing information services etc.

CA in Card activation method a. A user having some type of a digital permit buys a smart card in a store. The smart card is a platform for CA use, however it is not yet personalized for that user.

b. To activate/personalize the smart card, it is connected to a Smart Card Activation Device (SCAD). The SCAD may comprise for example a personal computer with means for connecting to smart cards and to other devices as required.
c. A digital document pertaining to that user is also entered into the SCAD. For example, the user may present a plastic credit card, wherein personal information for that user is recorded on a magnetic stripe in the card.
d. The SCAD binds together the information in the smart card and the personal document for the user in the plastic card, and generates a document that is transferred to the smart card.

This process "engraves" the personal information for that user into the smart card. Now the smart card is personalized to that user.

Thus, a customer may hold documents attesting to their identity. These may include an identity card, driver's license, a professional organization card, a student card, a credit card, an attorney card.

If the smart card is subsequently stolen, a thief cannot use it since the secret information therein (the personal information pertaining to the legitimate owner of the card) is not known to the thief.

To use the smart card as a CA, it will require a personal identification that only the legitimate owner of the card can provide, like a PIN. In one embodiment, the user may define or enter a personal password, that is only known to that user. The user may be allowed to choose any password at will.

The password is kept inside the smart card and may be used for subsequent authentication of that user.

In another embodiment, the PIN is derived from the information in the smart card, using a secret procedure. The procedure may be stored and executed in the smart card, in means that do not allow access to it from the outside. Thus, an intruder will not know how to compute the PIN from the information in the smart card. The smart card may display the PIN just once, to the legitimate user. Otherwise, the PIN may be displayed to a user during the smart card initialization procedure, that uses a Smart Card Activation Device SCAD as detailed above. When the smart card is initialized with the user's information, the PIN is computed in the SCAD and is displayed to the user.

The SCAD may comprise for example a personal computer or an Automatic Teller Machine ATM.

Furthermore, the PIN may comprise the result of computations performed on user's identification data that is stored in the smart card. Thus, for example, the PIN is a hash or CRC performed on the user's photograph, signature and/or fingerprint.

Thus, the PIN binds the smart card to that specific user.

Throughout the present disclosure, user identification data refers to information related to the user like the user's photograph, signature, voice signature, fingerprint and/or a combination thereof, each in a digital form suitable for automatic computer processing.

To achieve still better protection from tampering with the smart card, the device further includes PIN activation supervision means. These means allow only a limited attempts at presenting a PIN number. Thus, if a thief will try to find the PIN by a trial and error method, he will not be successful, since the supervision means will only accept a limited number of trials. After a predefined number of trials at entering the PIN number, the smart card will ignore further attempts. In another embodiment of the supervision means, the smart card will perform a self-destroy routine.

Thus, an unauthorized person will not be able to activate the smart card by an exhaustive procedure of trying all the possible values of a PIN.

The above detailed system and method allow to identify the owner of a smart card, using a PIN and/or physical characteristics of that user. User challenge procedures may be implemented.

The personal computer PC may include means for reading those physical characteristics. For example, the computer may include a video camera to input a user's image, to be compared to the photograph stored in the smart card.

The computer may include interface means to read the fingerprint pattern to the computer.

The computer may include voice input means, like a SoundBlaster or other Analog to Digital Converter ADC means.

The computer may include digitizer means to enter the user's signature in real time, to be compared with a digitized signature in the smart card.

An important result of the above methods and systems is the reliable identification of a person. The identification is automatically performed by a personal computer with a smart card, in a protected environment that is protected from tampering with.

This user identification may be subsequently used for various transactions, for example transactions over the Internet. Reliable user identification allow to perform various activities over the Internet, while preventing access from unauthorized persons.

Moreover, the whole identification process is local at the user's premises. All the identification information is kept local in the smart card and the local personal computer. None of the user's confidential information is sent over the Internet.

Thus, an important benefit of the present invention is that it allows reliable user identification for remote access or activities, while none of the user's confidential information is sent to a remote location.

This helps prevent an impostor from attacking the system, since that impostor will not have access to the information that is required for his attack. A possible impostor needs the information relating to the legitimate user, in order to present it to resource providers over the Internet for example.

In prior art systems that send the information relating to the user over the Internet, that information may be intercepted by an intruder and used for his attack. Thus, although such a method may be convenient to the user, it is not secure.

In other prior art systems, the user has to actually come to the offices of an organization that provides digital certificates, in order to be identified and issued a certificate. This is a secure method, however it is not convenient to the user. As an user may desire multiple certificates or permits at different times, this method may prove cumbersome and impractical.

In the present invention, however, a secure means to identify the user is provided. User authentication is achieved with a reliable yet easy to use procedure.

The user identification is traceable to known, accepted authorities—the authority that issued the smart card, and the authority that issued a former digital certificate or permit to that user. These are known, widely recognized and accepted entities, so that the identification means (the certificate thus issued) will be accepted at the remote location, for example the Internet.

Examples of Accepted Authorities:
a. For the smart card: a credit card issuer, like Visa or MasterCard or American Express. The credit card issuers are well known and anyone can check the validity of a specific smart card. The unique identification number in each smart card may be used to that purpose.

b. for the personal certificate/digital document:

an identity card issued by a Government;

a driver's license issued by a Government Agency;

a professional organization card, like an attorney's card, issued by a known organization like the national attorney's organization;

a student card, issued by a recognized university;

a credit card, issued by a credit card issuing firm.

It is accepted that any of the above documents is issued by a recognized authority, after identifying the owner of that document.

That user's authentication may be used for various purposes, for example to gain access to remote information databases or to buy over the Internet. There is no need to present a credit card number, as the user is known and acceptable to the remote provider of goods or services. That is, the user authentication according to the present invention may be used to replace the presentation of the credit card number.

The presentation of a credit card number over the Internet, as required in prior art transactions, is dangerous since the information may be intercepted en route and misused by unauthorized people.

The certificate in the present invention, however, may be safely used over the Internet for various transactions as desired.

To prevent repeat use of a certificate, the user may insert a time stamp into the certificate/permit thus issued. The digital document can be used only at that specific time and date. If presented at a later time by an impostor, this will be quickly detected.

Method of Use of CA in Commerce

System reads credit card—for example a magnetic card reader connected to a personal computer, reads the information recorded on the magnetic tape in the plastic card user enters PIN or other method of personal identification the smart card reads all the information and issues a certificate. The credit card details may be encrypted with the public key of the recipient, that is the other side, or the service supplier who is the other party to the transaction.

Detailed Method the smart card holds a unique ID of the CA and the user's password The smart card operates according to a fixed program that was set according to rules governing CA, a program that is fixed and cannot be changed by the user.

the user asks that the CA give him/her a certificate to attest to the user's ID. For example, that the user whose name is John Doe has the ID of 31415.

The user identifies himself with the PIN, to prove that he is the legitimate owner of the smart card.

The user presents the ID and a public key, and a challenge is performed. The smart card checks that the user holds the private key corresponding to that public key. This may be performed with the user performing an encryption with the private (secret) key.

Now the CA in the smart card knows that the user is indeed the person he claims to be, and that he possesses the encryption key pair as claimed. Of this key pair, only the public key was presented to the CA.

Based on the above, the CA in the smart card issues a certificate attesting to the above information. The preparation of the certificate is performed according to rules fixedly programmed into the CA in the smart card. That is, a certificate is only issued if the information given by the user and the details of the certificate comply with the rules for issuing certificates that are written in the CA and that govern its operation.

The CA attaches to the above certificate a permit issued to the CA, to the effect that the CA in this smart card is authorized to issue certificates of the type just issued. The permit, issued by the known and publicly recognized authority that prepared the CA in the smart card, indicates that the CA is authorized to issue certificates.

Notes:

The inclusion of the public key is optional; a certificate may omit it, as the case may be.

The CA in smart card, as purchased by the user, contains all the means and programs that are required to perform the above procedure. This is the product sold to the user.

Method of Use on the Internet a. The user presents a certificate from a credit card issuer (for example a credit card from Visa)

b. The user presents his ID with the certificate of the CA on smart card c. a challenge is performed versus the user's public key, to prove the identity of the user. This identification is based on the digital document that was presented to the CA, like the credit card attesting to the identification of the user by the credit card issuer, or of a bank for example.

d. the CA on card now issues a certificate, that is a digital document referring to the user of the smart card.

e. the user may use the certificate to identify himself/herself for transactions over the Internet.

An important goal of the CA in card and the above procedure is to allow the user to identify himself/herself to a remote party for various transactions with that party.

If the user is reliably identified to the second party, this is the basis to permit transactions with that second party. Now that other party may be sure that they will receive payment for services performed or goods ordered. Likewise, the other party is assured that the user is authorized to ask for information or services or goods over the Internet.

As a minimum, the certificate issued by the CA on card may be used to attest that the user is a reliable person (he has a credit card or a driver's license), or that he is indeed John Doe he claims to be.

In another application of the novel CA on card, a certificate may be used to attest that this user has a specific E-mail address, or that this user, that was identified by the CA on card, is the legitimate owner of a specific E-mail address or Internet name.

This attestation may be used to receive E-mail of a personal or confidential nature, where it is important to ensure that the message is received by the person it was addressed to.

Likewise, the technology may be used to transmit E-mail of a personal or confidential nature, where it is important to ensure that the message originated with the person who claims to have sent it.

In another embodiment, a smart card generates a random number and encrypts it with the private key of the CA. The other party receives a message encrypted with its public key, and returns a message to prove their identity.

If a party to a communication session has control over a specific E-mail, he can prove it by returning a message whose contents is responsive to a message received in that E-mail address.

A basic function of CA in a card is to identify a person. A reliable identification is performed and a reliable digital document (certificate) is issued to prove it. The certificate attests that the holder of that certificate is indeed the person he/she claims to be.

At present, it is difficult for one party to verify the identity of another party. The other person may be at a remote location, with the parties communicating over the Internet or using other means of communications. The novel technology disclosed in the present invention will allow to reliably identify the other party to a transaction.

An enhanced certificate may include additional information like the details of a credit card to be used for an Internet transaction.

In a further advanced application, the certificate may include a wide range of information about the user/card holder, like a photograph, fingerprints, personal signature and/or other personal information.

The photograph or fingerprints, for example, may be detailed in a digital file like a bit map or a picture vector representation or another method.

The certificate may implement a digital identity card, passport or other personal document.

A certificate or permit may be kept in a computer or another means for file storage. This document does not contain sensitive information and can be therefore stored in any place or presented to anyone. To use that digital document, however, one has to possess the corresponding private key and/or the corresponding PIN.

A user may have many certificates, for example each one for a different Internet address held by that user. A user may have several credit cards or several nicknames. The user may present one of his/her certificates, as dictated by circumstances or the specific transaction to be performed. This allows a user to consolidate their permits and/or certificates.

There may be permits that require user identification, whereas other permits may not need it. Accordingly, a user may present a certificate or their identification card for example.

A permit may be sent en clair over a public network. To use the permit, however, a user may have to prove his identity. This method allows for sending permits openly, while ensuring that only the legitimate recipient can use that permit.

Methods of Operation of the CA in a Card

A method is suggested to establish a "CA on a card"—which means a user can purchase a smart-card, and create his own authentication, where the CA that establishes the authentication, is virtually on the card.

The CA on the card is able to verify the user's authentication trough existing digital authentication, that most users already hold, for example their Credit card and PIN number.

Once a user slides in his/her credit card, and punches his PIN number, it can be said to a good degree of confidence that he is authenticated. This is the confidence level corresponding to the fact that the credit company authenticated the user, and it is trusted enough to supply goods or money.

Some or part of the details on the credit card can be transferred to the digital form of a Certificate or a Permit.

Method 1: Full Authentication

This authentication is possible, when the information stored on the media, is protected by some kind of PIN, or other information (such as finger-print), that the apparatus can check.

For example, if on a credit card, the name is encrypted with the

PIN, in a way that, if the name was maliciously changed, the PIN check would not turn out OK.

Example that does not allow off-line full authentication, but applies to authentication on-demand:

Name, picture, fingerprint, signed by a trusted third party, stored on a credit card. (Unless the apparatus can check fingerprint or picture, in which case it can be off-line full authentication).

The method will be illustrated by way of example for credit card.

We would like to create an authentication permit from a trusted authenticating party, for the user who wants to be authenticated.

For example a Certificate Authority, that we shall refer to as CA, may be used to generate that permit. The CA shall empower the CA on the card to perform the verifications necessary and to create the permit.

The result permit can be stored on the same smart card, so it would be mobile and safe.

The method is built on the following components:
1. smart-card (with software)
2. smart-card credit-card connecting apparatus.
3. smart-card PC connecting apparatus.
4. PC with software.

a. Purchase Stage:

The smart card can be sold on any store, with or without software for the PC, the software can be from any other source, including Internet.

Each smart card, contains software, and a special permit from the CA allowing it to authenticate a user in the CA behalf.

Also included on the smart card are public key/private key pair for the smart card, its own ID, and a digital certificate.

All the above define the components of the CA on the card.

So the smart card can come from the factory with its own unique digital-ID, and with a copy of the CA's public key.

It may come with its own set of private/public key: and a certificate that binds its identification (ID) and public key.

Another option is that it will not come ready with keys, but with a special password, and will create its keys later when it is connected to the PC, and gets its certificate on-line, by a communication line supplied by the PC. (Internet for example)

When the CA on the card creates permit of authentication, the ID that receives the permit can come already on the smart-card.

If the receiver ID is on the smart card, it can come with its public/private key pair or without it. In the latter case, the keys are created later.

b. The Binding Stage:

The smart-card is connected to the smart-card credit-card connecting apparatus. When the credit card is inserted, it's details are copied into the smart card, and can never be changed again.

(This is required so that this apparatus would not be used to crack credit cards.)

c. The Activation Stage:

At this stage we assume that the software was safely installed on the computer.

The user connects the smart-card to the computer using the smart-card PC connecting apparatus.

(if the smart-card was without CA on card private/public keys, it creates them and get a certificate that binds them with its ID. The special password (which is sent encrypted) ensures that there will be no other apparatus with the same ID)

The user can now choose whether it would like to use the receiver keys and/or ID that are on the smart card, or would like to create his own.

He can also transfer ID/keys from another device, through the PC.

The keys that the smart card created for the CA never goes out of the card.

It is recommended that the user creates his own set of private/public keys with his own ID, which can be later stored on the smart card.

The user can create his own keys, and transfer to the smart card only his ID and public key (and the certificate that binds them).

In that case, the smart card challenges the computer to make sure he has both keys. (or that the computer can transfer the key set to the smart card).

The user would now be asked to punch in his credit card PIN number.

The smart-card, through a special software installed in it, will check that this PIN number is correct. (If it's not correct, the user will be prompted again for a limited number of times, after which, the smart-card locks itself forever. This is done so it won't be used to crack credit-cards.)

After the user entered the correct PIN number, the smart card KNOWS that this user is really the one on the card, as it passed authentication. It also knows that the user is an owner of the appropriate ID, therefore it issues an authentication permit under the license given to it by the CA, to authenticate that ID as the name (as stated on the credit card).

As described, the process could be done off-line.

The process comprises the following stages:
1. user purchases smart-card.
2. user connects smart-card and credit card.
3. (after installing software) user connects smart-card and PC.
4. user punches PIN on the PC.

This is only an example. An other possible example is that the user would like to transfer a permit from one ID to the other, or a permit from one format to the other.

If this is the case, and the issuer of the permits allowed it (can be stated on the permit, or as otherwise known to the CA on the card). The binding and activation are done in a similar way, but the old permit can be transferred through the computer connection, and the activation through a challenge instead of PIN number.

Since the general CA is trusted, its subordinate on the card is also trusted, and since the card is self-contained, both CAs are trusted to the same degree.

If the system requires, the CA on the card can make inquiries "in the world", by connection supplied by the PC, such as an Internet connection. Since the CA on the Card holds the general CA public key, the session can be encrypted and authenticated.

Also, instead of a PC, a special device can be supplied.

Method 2: Partial Authentication

It can be that a full authentication is not required. This might be the case, if the credentials are given in such a way, that they are given, but are depended on an other form of authentication, such a fingerprint, or photo.

In this case the smart-card can verify the correctness of the information, and create a permit, that a certain ID, or entity is given credentials, and for example, includes its photograph or fingerprints. Only after authentication by the required parameter, the credentials are given.

Figure 3:
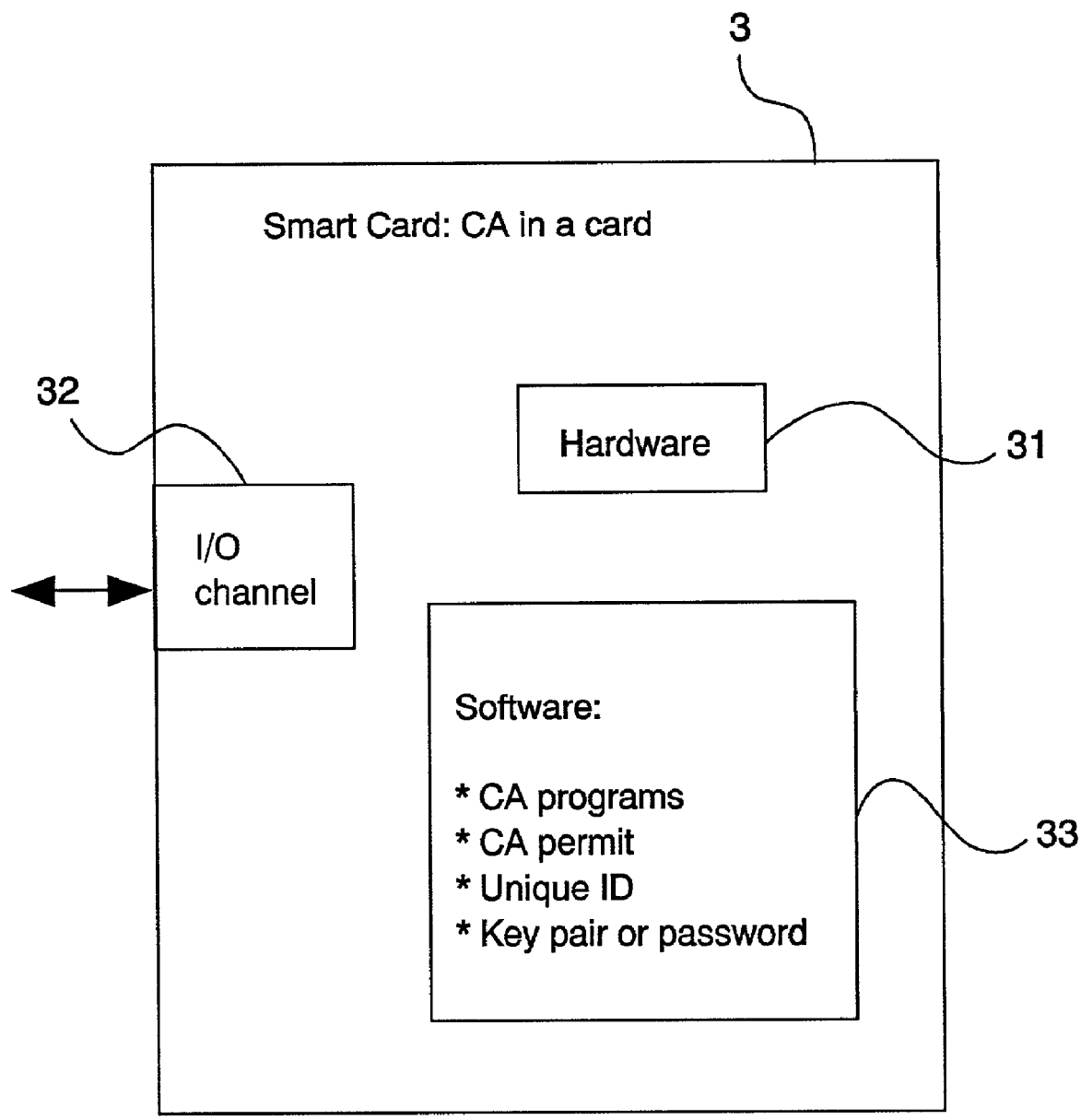
FIG. 3 details the structure of a smart card for performing CA.

FIG. 3 details a smart card structure. The CA in a card 3 is preferably implemented as a smart card device. It includes hardware means 31 to store the information and perform computations and input/out control, and I/O channel means 32 to connect to a card reader, the PC and/or the user of the device. It may include several channels to that purpose.

The software 33 includes the various programs that govern the operation of the device and the various parameters/data as required.

The Structure of CA in a Card

Certifying authority CA 3 may be implemented with electronic means; preferably in a smart card.

It uses CA electronic means with means for protection against tampering with. This is a requirement, prerequisite for reliable CA operation.

Implementation examples: in smart card; shaped like a plastic card or a smart card in wristwatch, for example. Includes interface means with a computer PC.

This allows to generate new smart cards in watch for example, with certificates therein. It is also possible to update the information in the smart card.

One physical device may contain many smart cards, of various types. to replace many plastic cards/smart cards now in use that the user has to hold separately.

The device includes means for protecting the programmed method from tampering with. This ensures that the device will operate as a certifying authority according to the program or document issuing method that originates with the known authority. This is the fixed program that is built into the smart card at an early stage, to govern its operation.

Figure 4:
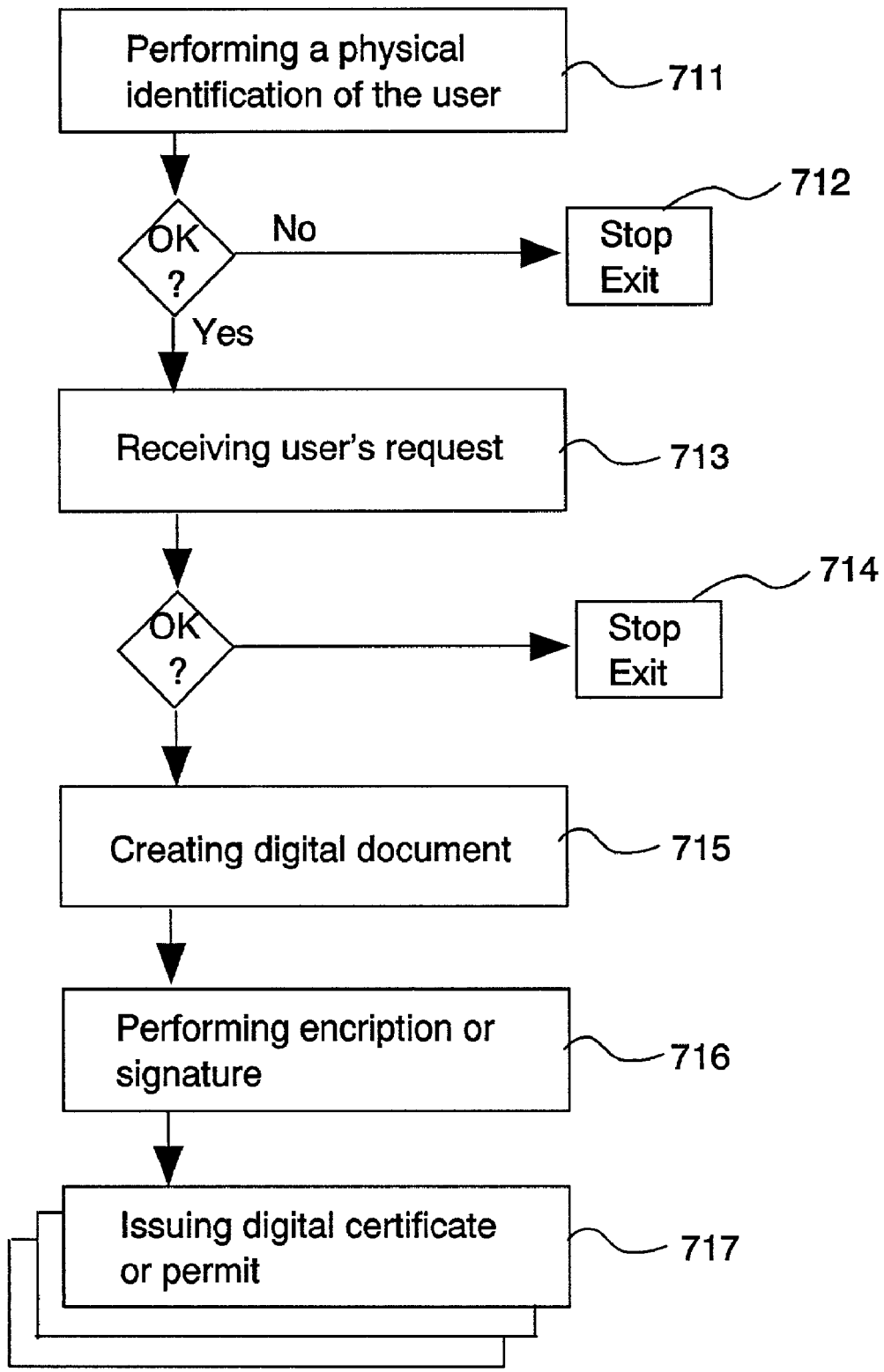
FIG. 4 details a method for issuing a certificate or permit

Method for Issuing a Certificate or Permit (see FIG. 4)

One embodiment of the method comprises the following stages:

performing a physical identification of the user 711 to ensure that the person asking for the certificate is the one to whom the prior document refers prior identification of the user, as recorded in a prior issued digital document stopping if failed ID 712 receiving user's request 713 stopping if illegitimate req. 714 creating digital document 715 using a protected procedure, set up by a known authority, to issue certificates based on A, B.

Addition of permit, ID or a certificate held by that person, which certificate is already signed by a known authority performing encryption or signature 716, in order to be recognized by others, has to include an encryption or signature with the private key of a known authority.

That information is contained in the CA device in a secure memory, that is a memory that cannot be read nor cannot it altered by anyone. Only the device itself can update data therein or may destroy itself if necessary.

issuing digital certificate or permit 717

A distributed system can thus be implemented, wherein each user can create certificates for himself/herself, certificates that are authorized by a known authority.

Method for Implementing a Certifying Authority (CA) in a Card

Figure 5:
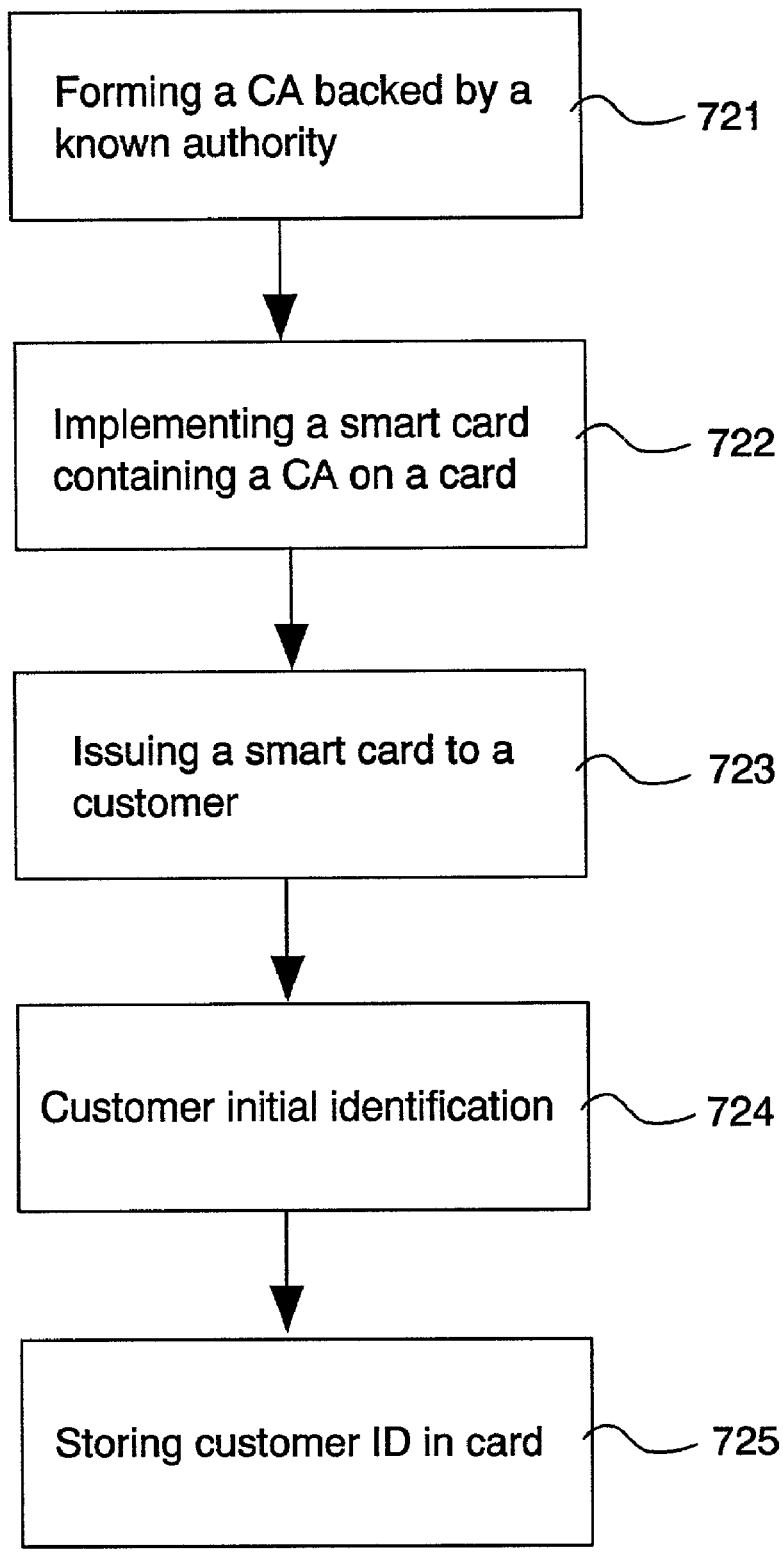
FIG. 5 details a method for implementing a Certifying Authority (CA) in a card

One embodiment of the method comprises the following stages, See FIG. 5:

Forming a CA backed by a known authority 721

Implementing a smart card containing a CA on a card 722, that is a capability to perform the functions of CA as defined by the original CA.

issuing a smart card to a customer 723.

the smart card includes c. The new smart card, that is sold to a customer, contains:

a pair of encryption keys, comprising a private and a public key an identification number (ID) that is unique to that smart card a digital certificate that links the above two values, that is the ID and the encryption key, issued by the known manufacturer of smart cards Initially, the smart card may contain only the ID, without the encryption keys. The encryption keys may be added later.

A permit or authorization from a known authority, that the smart card is authorized to issue permits in the name of that authority.

For example, Visa may issue a permit to the card that the card is authorized to issue permits/certificates in its name.

storing the customer initial identification 724, to create a digital document storing customer ID in card 725

Thus, the smart card now can issue permits/certificates in the name of the original CA authority (Visa for example), to people desiring these documents from that known authority.

The unique ID in the smart card allows for traceability of the permit to source, that is to track the permit to source.

CA in Card Activation Method

Figure 6:
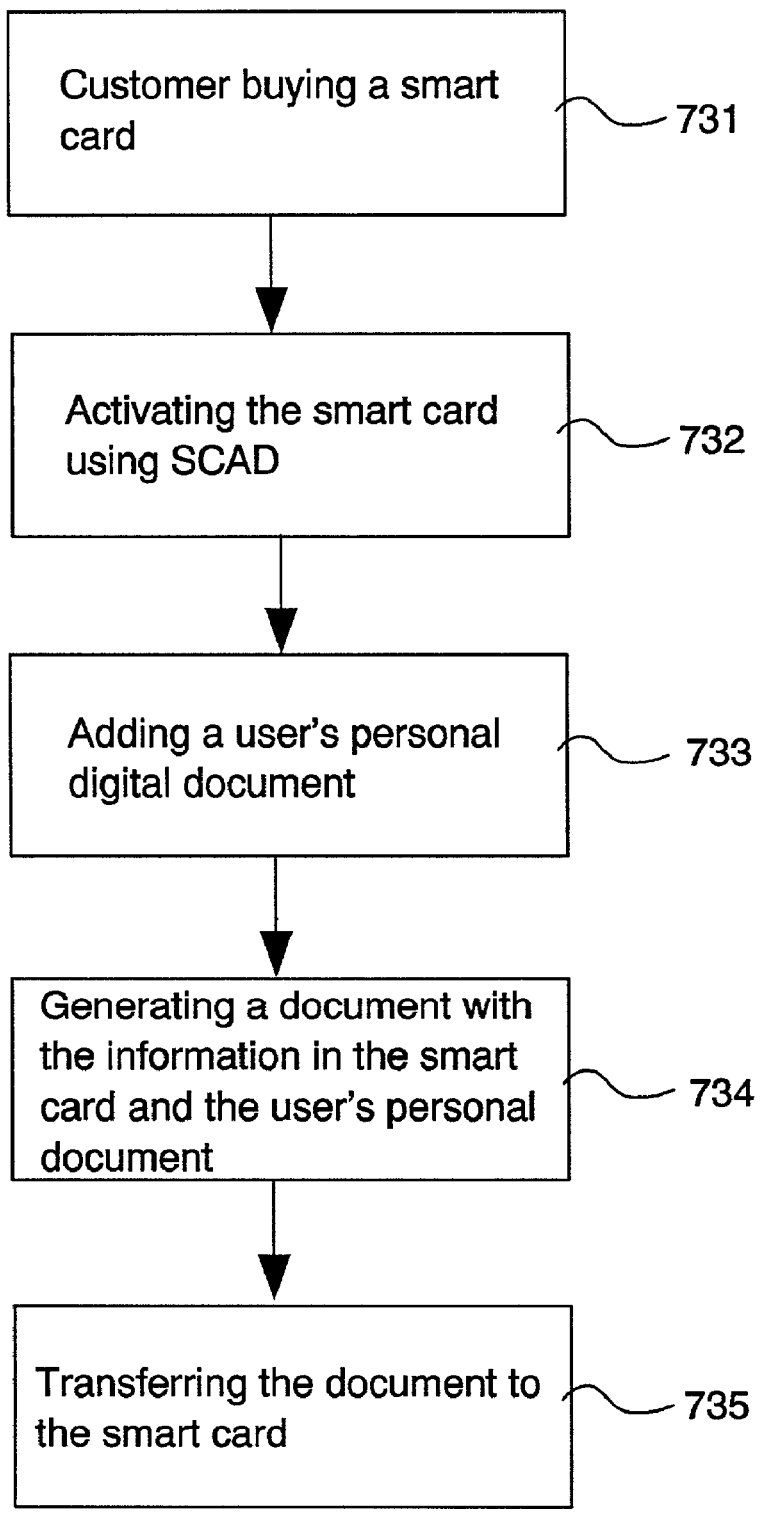
FIG. 6 details a CA in Card activation method

One embodiment of the method comprises the following stages, See FIG. 6:

customer buying a smart card 731 a. A user having some type of a digital permit buys a smart card in a store. The smart card is a platform for CA use, however it is not yet personalized for that user.

activating the smart card using SCAD 732 b. To activate/personalize the smart card, it is connected to a Smart Card Activation Device (SCAD). The SCAD may comprise for example a personal computer with means for connecting to smart cards and to other devices as required.

adding a user's personal digital document 733 c. A digital document pertaining to that user is also entered into the SCAD. For example, the user may present a plastic credit card, wherein personal information for that user is recorded on a magnetic stripe in the card.

generating a document with the information in the smart card and the user's personal document 734 for the user in the plastic card document transferring the document to the smart card 735

This process "engraves" the personal information for that user into the smart card. Now the smart card is personalized to that user.

Method of Use of CA in Commerce

Figure 7:
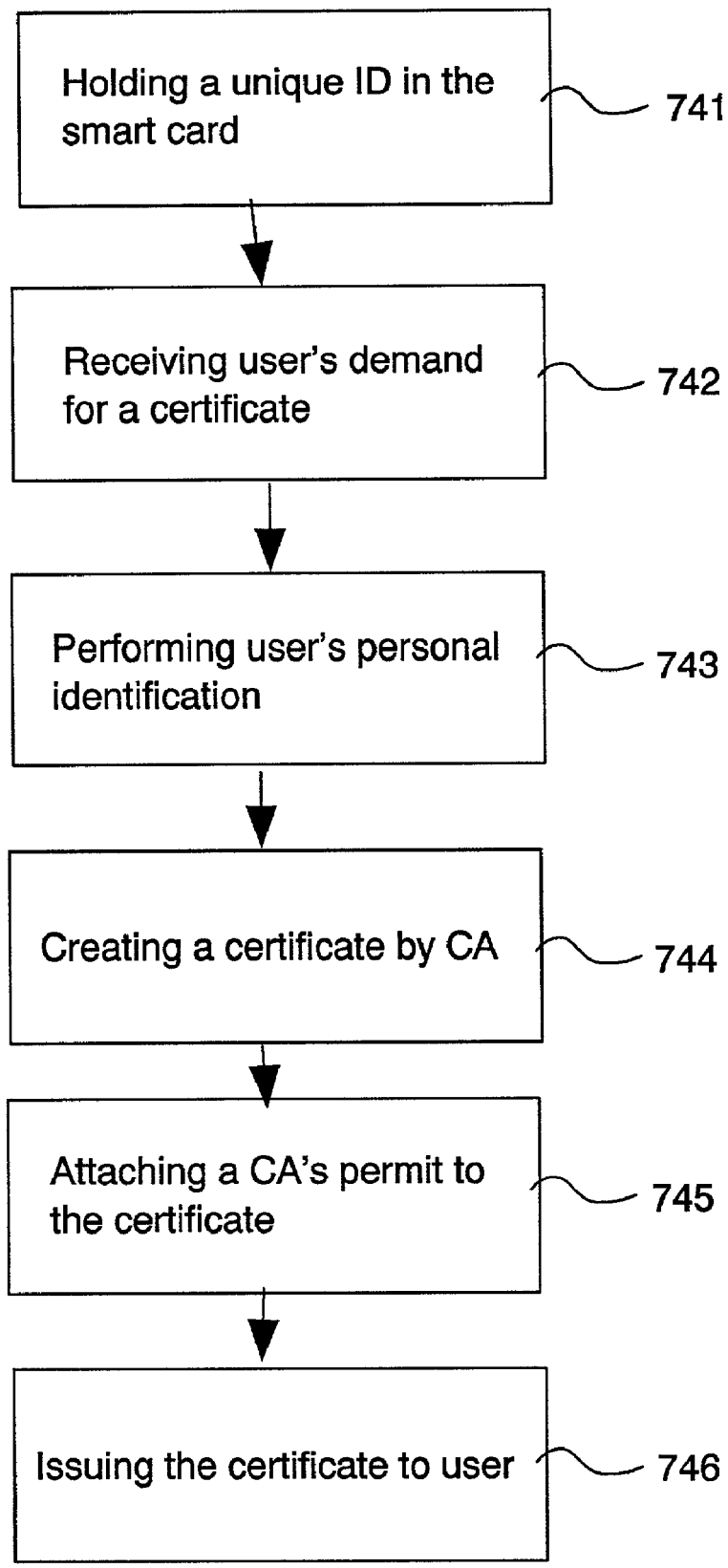
FIG. 7 details a method of use of CA in commerce

One embodiment of the method comprises the following stages, See FIG. 7:

holding a unique ID in the smart card 741 the smart card holds a unique ID of the CA and the user's password The smart card operates according to a fixed program that was set according to rules governing CA, a program that is fixed and cannot be changed by the user.

receiving user's demand for a certificate 742—the user asks that the CA give him/her a certificate to attest to the user's ID. For example, that the user whose name is John Doe has the ID of 31415.

performing user's personal identification 743—user enters PIN or other method of personal identification The user identifies himself with the PIN, to prove that he is the legitimate owner of the smart card The user presents the ID and a public key, and a challenge is performed. The smart card checks that the user holds the private key corresponding to that public key. This may be performed with the user performing an encryption with the private (secret) key.

Now the CA in the smart card knows that the user is indeed the person he claims to be, and that he possesses the encryption key pair as claimed. Of this key pair, only the public key was presented to the CA.

creating a certificate by CA 744

Based on the above, the CA in the smart card creates a certificate attesting to the above information. The preparation of the certificate is performed according to rules fixedly programmed into the CA in the smart card.

That is, a certificate is only issued if the information given by the user and the details of the certificate comply with the rules for issuing certificates that are written in the CA and that govern its operation.

attaching a CA's permit to the certificate 745

The CA attaches to the above certificate a permit issued to the CA, to the effect that the CA in this smart card is authorized to issue certificates of the type just issued. The permit, issued by the known and publicly recognized authority that prepared the CA in the smart card, indicates that the CA is authorized to issue certificates.

issuing the certificate to user 746 reading existing credit card 741

System reads credit card—for example a magnetic card reader connected to a personal computer, reads the information recorded on the magnetic tape in the plastic card reading information and issuing a certificate 743 the smart card reads all the information and issues a certificate. The credit card details may be encrypted with the public key of the recipient, that is the other side, or the service supplier who is the other party to the transaction.

Various means may be used to protect the program in the device. For example, the program may be written in Read Only Memory ROM means that are physically difficult to change; otherwise, the device is built with no access from the outside to the program memory—the memory can only be read by the internal processor in the smart card.

It will be recognized that the foregoing is but one example of an apparatus and method within the scope of the present invention and that various modifications will occur to those skilled in the art upon reading the disclosure set forth hereinbefore.

What is claimed is:

1. A method of transferring the functionality of a smart device ("existing device") to a different smart device ("new device"), without the need of intervention of a third trusted authority and/or device, whereas the said functionality of the existing device is allowed to the user by a certified digital document of a certifying authority (CA), comprising:

implementing in the new device a document issuing policy of the certifying authority (CA); and reading from the existing device into the new device without the intervention of a third trusted device the said certified digital document associated with the said user; and generating by the new device a new certified digital document according to the said issuing policy of the said CA, without the intervention of a third trusted authority and/or device which permits the user to use the new device with the same functionality of the existing device.

2. The method according to claim 1, wherein information associated with the identity of the new device or it's user is stored within the new device.

3. The method of claim 1, wherein the issuing policy attests to personal identifying information of the user of the device.

4. The method of claim 1, wherein the new certified digital document is output by the new device through a communication channel.

5. The method of claim 1, wherein the certified digital documents are permits or certificates.

6. The method of claim 1, wherein a person using the new device to sign or certify a digital document is requested to identify himself prior to the new device signing or certifying the digital document.

7. The method of claim 6, wherein a user identifies himself using biometric identification information.

8. The method of claim 1, wherein a plurality of certified digital documents associated with the user are stored within the new device, each of which plurality of certified digital documents is associated with a different certifying authority.

9. A smart device associated with a user, adapted to obtain the functionalities of the said user smart devices ("existing devices"); without the need of intervention of a third trusted authority and/or device, where the said functionalities are allowed by certified digital documents of a certifying authority (CA) comprising:

a controller adapted to execute a program associated with the certifying authority (CA) based on a document issuing policy of the certifying authority (CA); and The controller reads a certified digital document associated with its user from the existing devices, and According to the said issuing policy the controller generates without intervention of a third trusted authority and/or device, a new certified digital documents which permit the user to use the new device with the same functionalities of the existing devices.

10. The smart device according to claim 9, wherein the said program generates the new certified digital document from a certified document associated with the user if data in the certified document is consistent with the document issuing policy.

11. The smart device of claim 9, wherein the controller reads a digital document provided to the smart device and signs or certifies the digital document only after the electronic device attests to personal identifying of the user.

12. The smart device of claim 11, further comprising a biometric data input module.

13. The smart device of claim 9, wherein a plurality of certified documents associated with the user are stored within the smart device, each of the plurality of certified documents are associated with a different certifying authority.

14. The smart device of claim 9, wherein the smart device is functionally associated with a wristwatch.

15. The smart device of claim 9, wherein the smart device is functionally associated with a smart card.

* * * * *